United States Patent
Jourden et al.

(10) Patent No.: US 6,510,663 B2
(45) Date of Patent: *Jan. 28, 2003

(54) IN-FILL ARRANGEMENT FOR POST AND BEAM FURNITURE SYSTEMS

(75) Inventors: Michael A. Jourden, Grand Rapids, MI (US); Karl Heinz Mueller, Grand Rapids, MI (US); Genevieve Wing, Belding, MI (US)

(73) Assignee: Steelcase Development Corporation, Caledonia, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/800,005

(22) Filed: Mar. 6, 2001

(65) Prior Publication Data

US 2002/0124510 A1 Sep. 12, 2002

(51) Int. Cl.⁷ .................................................. E04H 1/00
(52) U.S. Cl. ................... 52/238.1; 52/650.3; 52/243; 52/650.1; 52/481.2; 52/225; 52/781; 52/243.1; 52/239; 52/220.1; 52/282.1; 52/245; 52/236.2; 403/282; 403/292; 403/293; 403/403
(58) Field of Search ............................. 52/238.1, 243, 52/650.3, 650.1, 481.2, 775, 781, 243.1, 239, 220.1, 282.1, 245, 236.2; 403/282, 292, 293, 403; 160/135

(56) References Cited

U.S. PATENT DOCUMENTS

| | | | |
|---|---|---|---|
| 4,143,698 A | | 3/1979 | Smolka |
| 4,979,554 A | | 12/1990 | Nelson |
| 5,287,666 A | * | 2/1994 | Franscaroli et al. .......... 52/239 |
| 5,511,348 A | | 4/1996 | Cornell et al. |
| 5,675,949 A | | 10/1997 | Forslund et al. |
| 5,768,840 A | | 6/1998 | Feldpausch et al. |
| 5,784,843 A | | 7/1998 | Greer et al. |
| 5,826,639 A | | 10/1998 | Miller |
| 5,899,025 A | | 5/1999 | Casey et al. |
| 5,906,079 A | * | 5/1999 | Brickner et al. .............. 52/239 |
| 5,950,371 A | | 9/1999 | Rives et al. |
| D415,901 S | | 11/1999 | Arko et al. |
| 6,009,930 A | | 1/2000 | Jantschek |
| 6,067,762 A | | 5/2000 | Greer et al. |
| 6,073,399 A | | 6/2000 | Shipman et al. |
| 6,112,472 A | | 9/2000 | VanDyk et al. |
| 6,128,873 A | | 10/2000 | Shipman et al. |
| 6,170,200 B1 | | 1/2001 | Cornell et al. |
| D446,659 S | * | 8/2001 | Ludwig et al. ............... 52/245 |
| 6,286,276 B1 | * | 10/2001 | Shipman et al. .............. 52/239 |

* cited by examiner

*Primary Examiner*—Carl D. Friedman
*Assistant Examiner*—Nahid Amiri
(74) *Attorney, Agent, or Firm*—Price, Heneveld, Cooper, DeWitt & Litton

(57) ABSTRACT

An in-fill panel arrangement is designed for post and beam furniture systems of the type having overhead beams supported on vertical posts. Each of the beams has a lowermost face with a horizontal slot extending therealong, and each of the posts includes outwardly extending flanges having an end face with a slot extending vertically therealong. Beam-to-post connectors are attached to the opposite ends of the beams, and are detachably retained in the slots in the posts to mount the beams on the posts. Rigid in-fill panels are shaped to be positioned directly below the beams and above the floor to partition the space into individual work areas. Panel mounting brackets are detachably retained in the slots in the posts and the beams, and are connected with the in-fill panels. The slots in the posts and the beams are substantially identical in size and shape to define an integrated universal mounting arrangement wherein the posts and the beams can be interconnected in alternative configurations, and the in-fill panels can be mounted at a variety of different locations. The in-fill panels may have an arcuate shape, and can be positioned in an alternating facing relationship to create a serpentine shape.

50 Claims, 7 Drawing Sheets

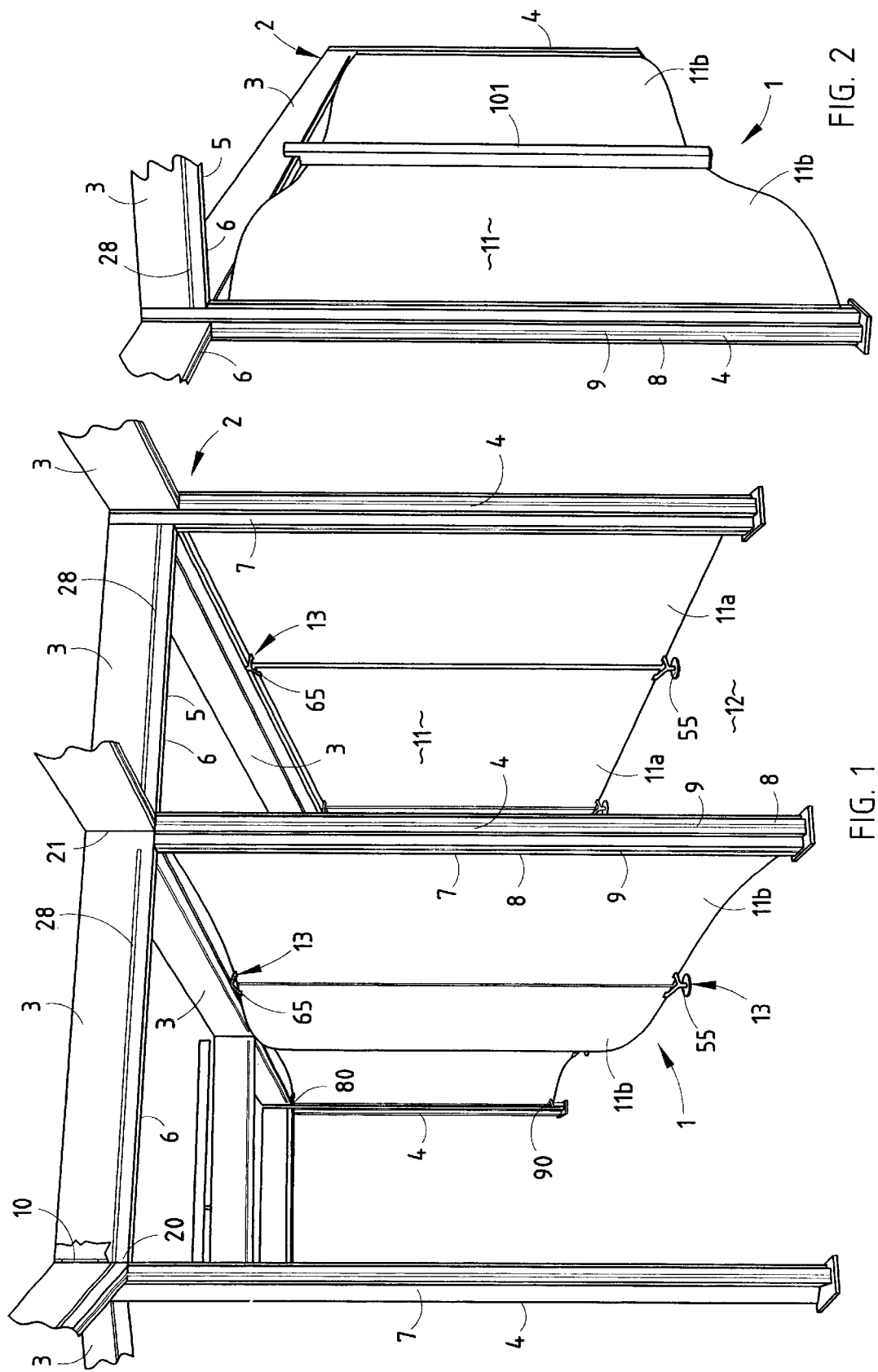

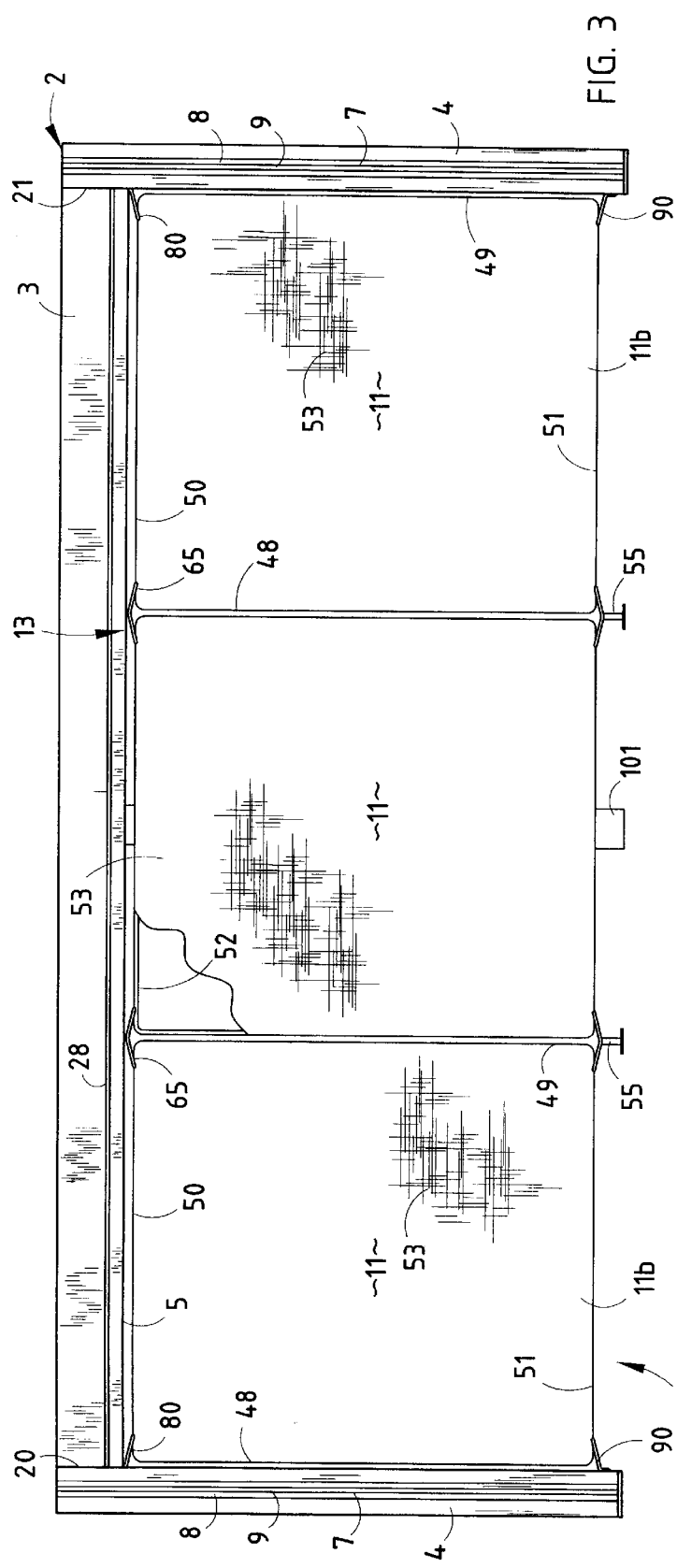
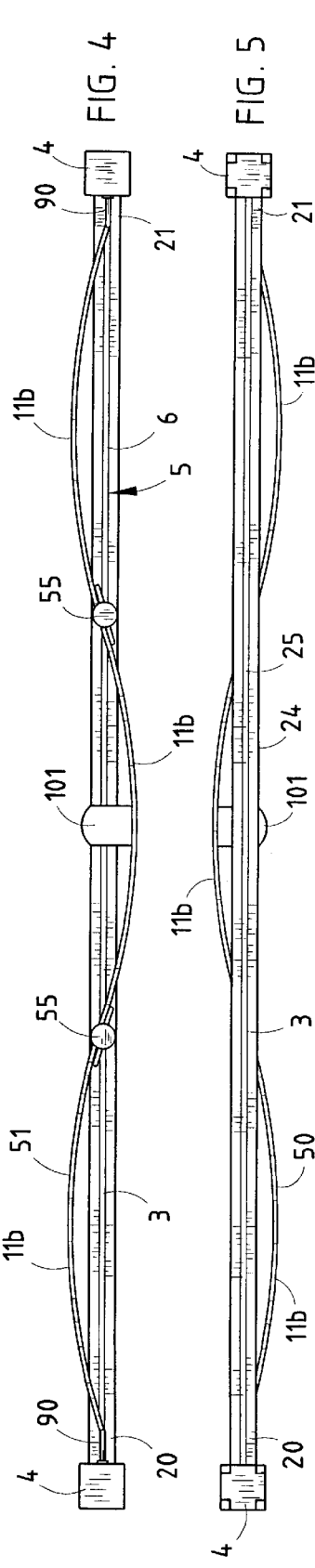
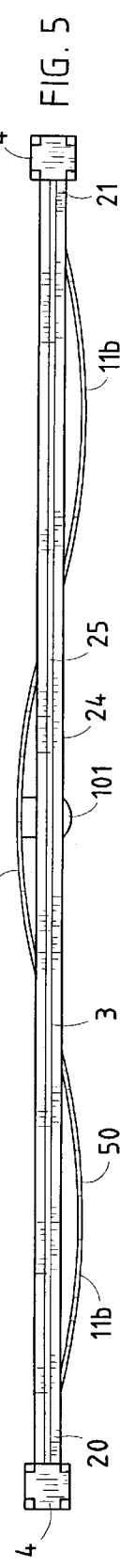
FIG. 3
FIG. 4
FIG. 5

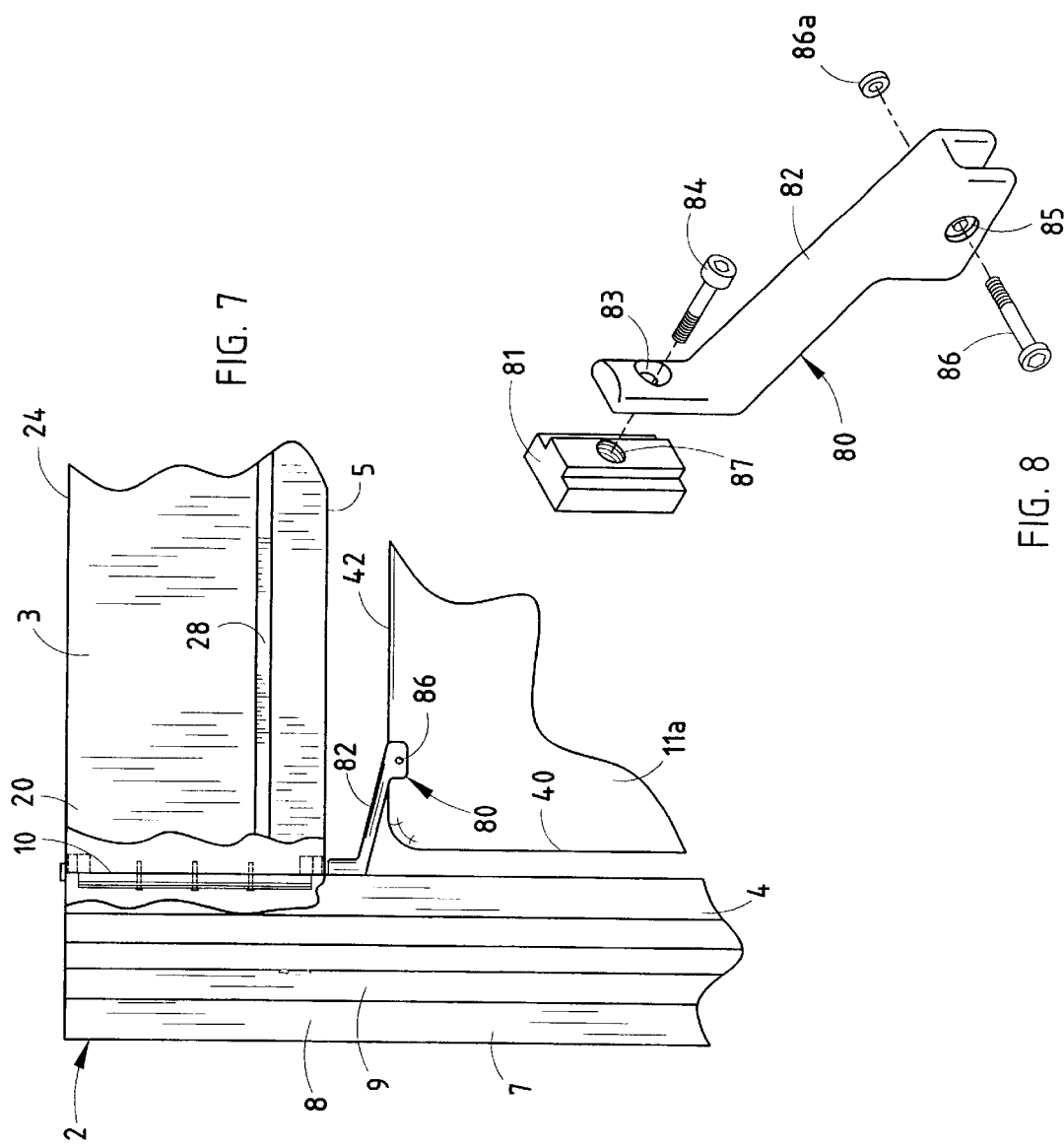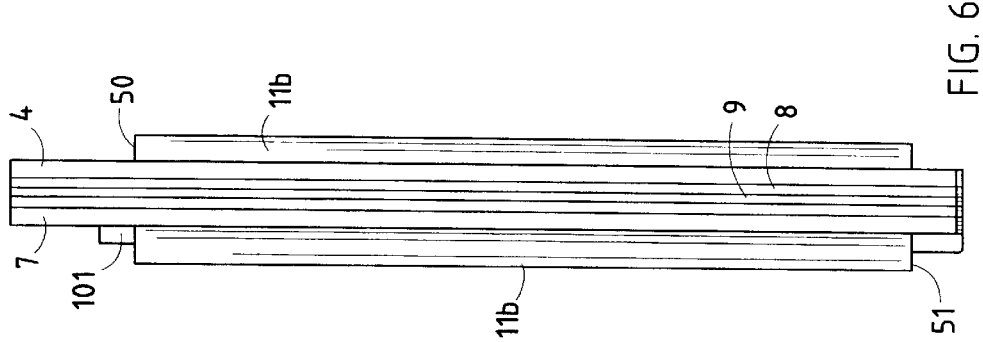

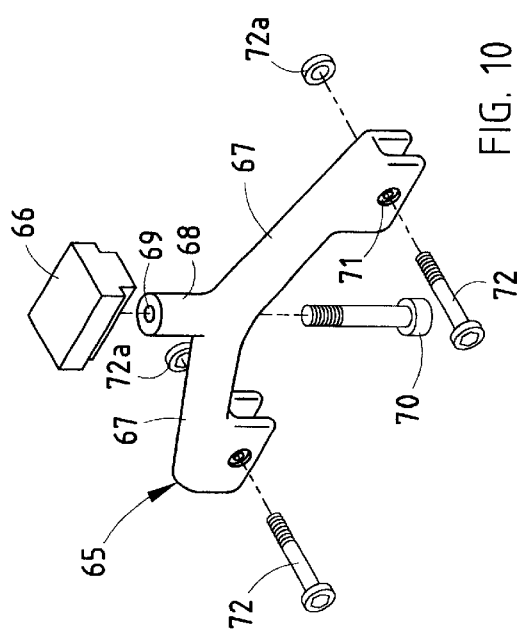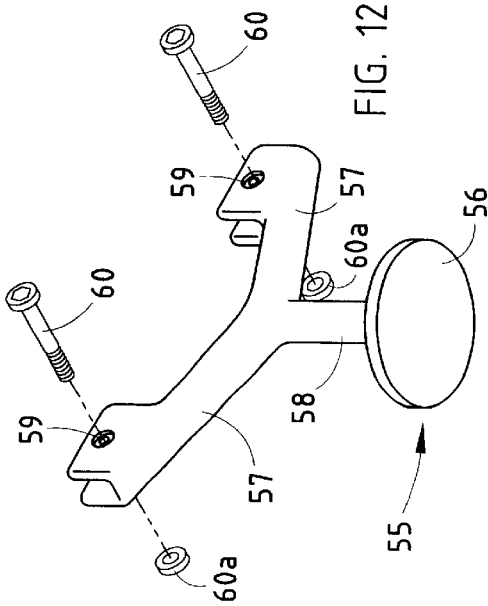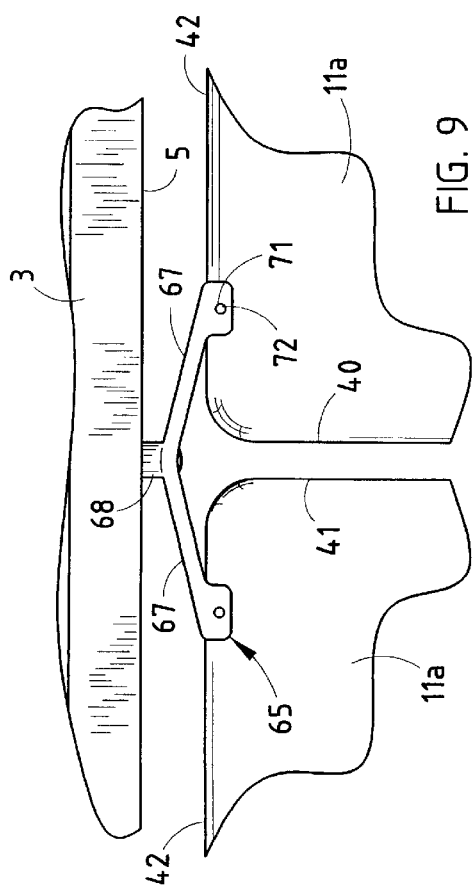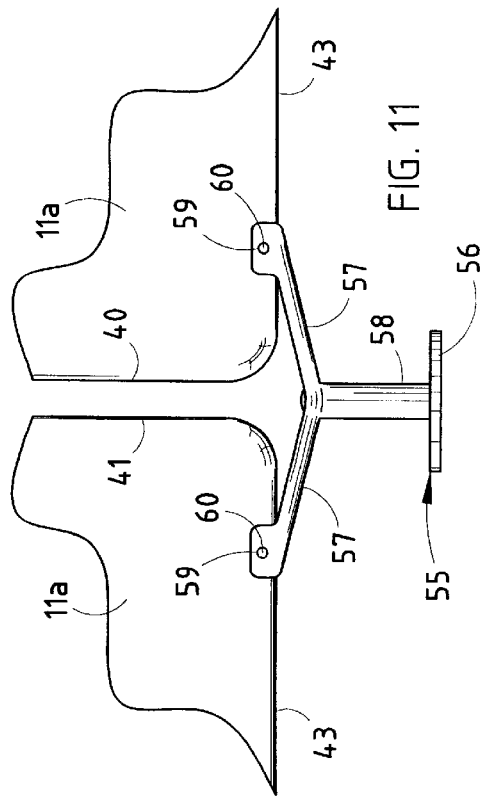

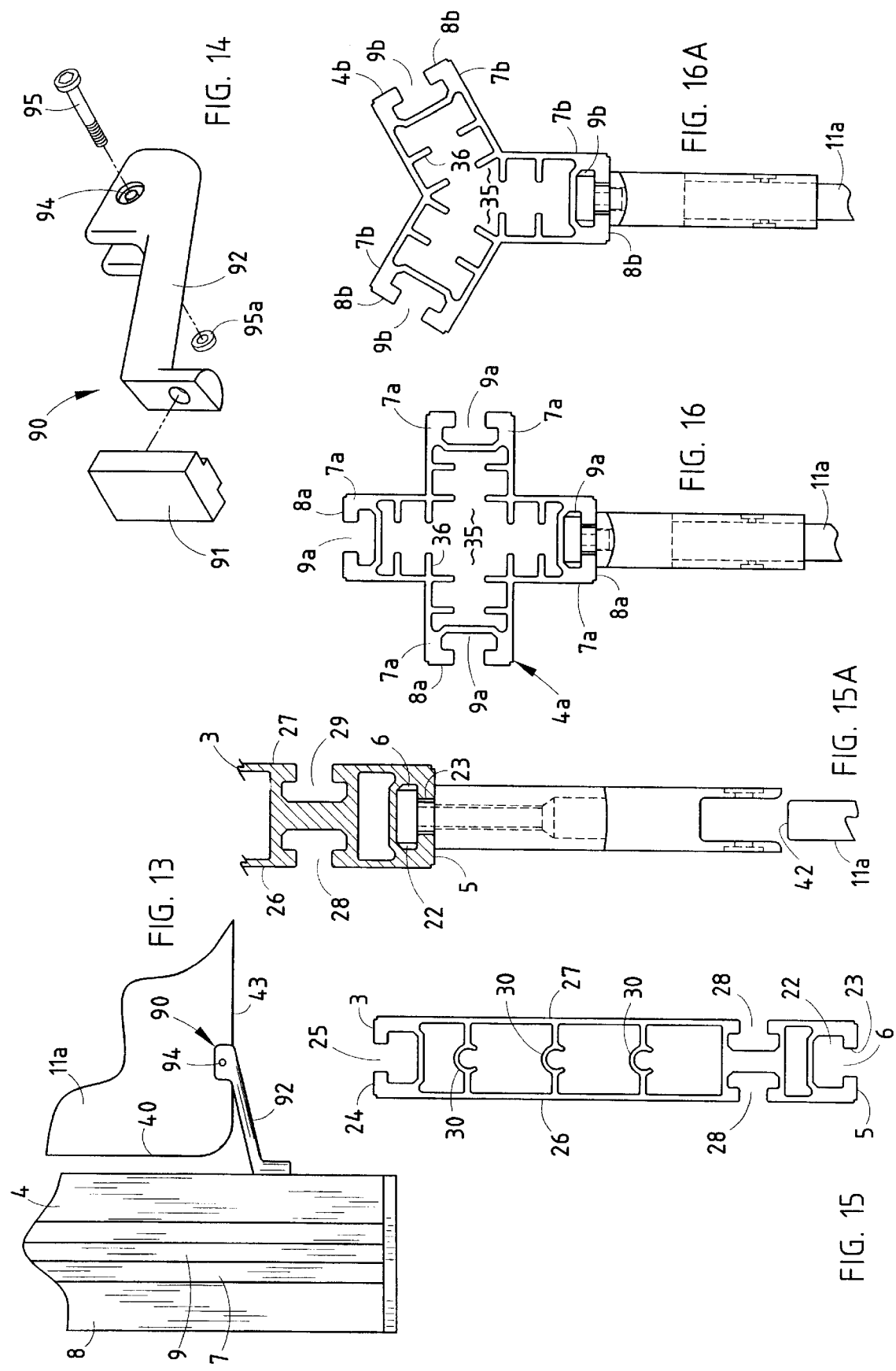

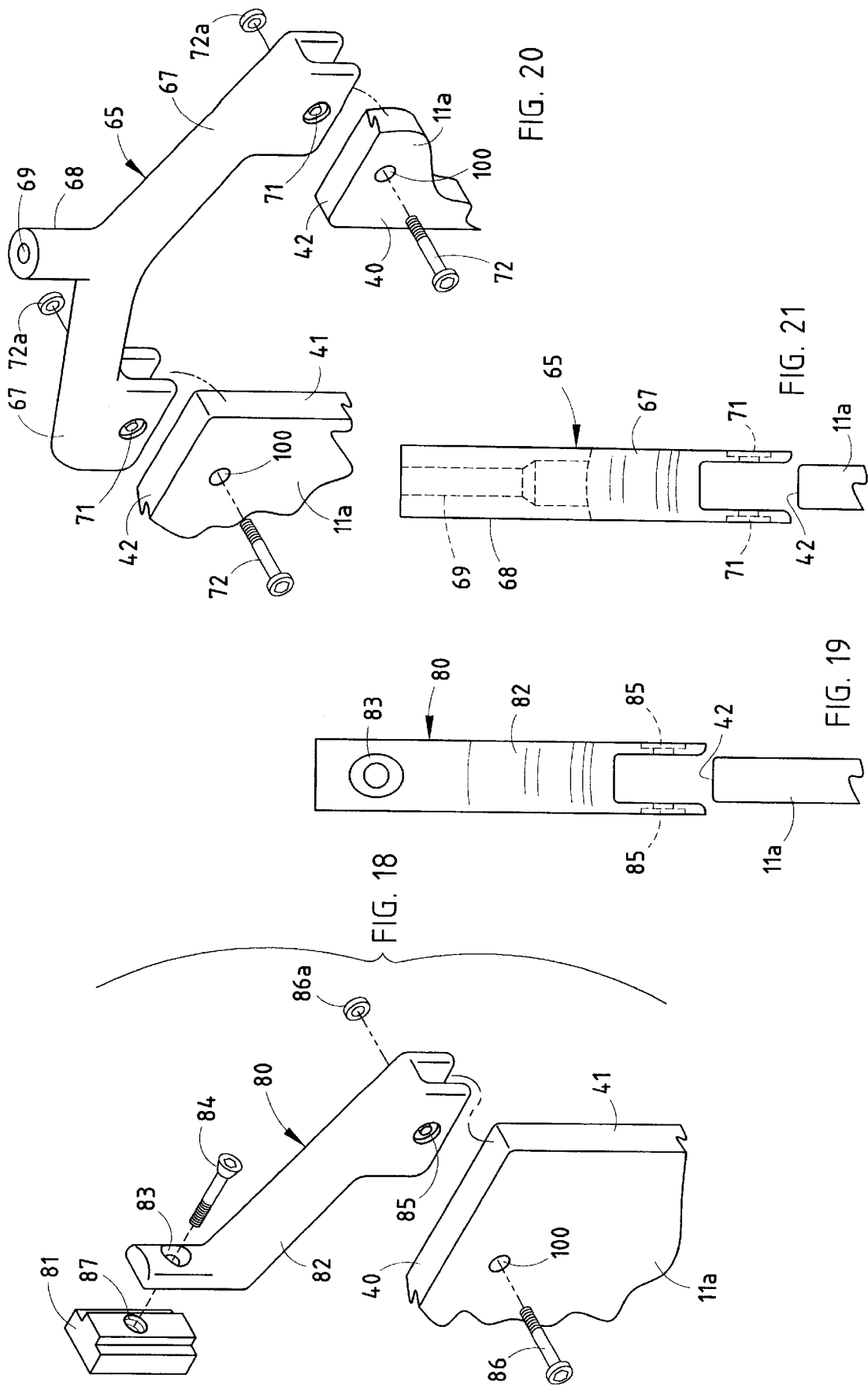

IN-FILL ARRANGEMENT FOR POST AND BEAM FURNITURE SYSTEMS

CROSS REFERENCE TO RELATED APPLICATIONS

The present application is related to commonly assigned, copending U.S. patent application Ser. No. 09/800,006, filed Oct. 23, 2000, entitled POST AND BEAM FURNITURE SYSTEM, as well as U.S. patent application Ser. No. 09/800,007, filed Oct. 23, 2000, entitled EXTERNAL WIRE MANAGER FOR POST AND BEAM FURNITURE SYSTEM, which are hereby incorporated herein by reference.

BACKGROUND OF THE INVENTION

The present invention relates to furnishings for open office spaces and the like, in particular to an in-fill panel arrangement for post and beam furniture systems.

Portable partition systems for open office spaces and other similar settings are well known in the art. Individual partition panels are interconnected in different configurations to form separate offices, workstations and/or work settings. The partition panels are extremely durable and can be readily disassembled and reassembled into alternative configurations to meet the ever-changing needs of the user. Examples of such partition systems are provided in U.S. Pat. Nos. 3,822,146; 3,831,330; and 4,144,924, which are owned by Steelcase Development Inc., the assignee of the present application.

Post and beam furniture systems have also been developed to divide open plans three dimensionally into individual workstations and/or work settings. Examples of such furniture systems are provided in U.S. Pat. Nos. 6,003,275; 5,950,371; and 5,889,025, which are also owned by Steelcase Development Inc., the assignee of present application.

Changing technology and changing work processes demand that current office furnishings be readily adaptable to efficiently support the ever-changing needs of workers, such that the reconfigurability of the system, and placement of in-fill panels at different locations is desired to meet these needs.

SUMMARY OF THE INVENTION

One aspect of the present invention is a post and beam furniture system for partitioning open office space and the like, comprising a plurality of overhead beams, each having opposite ends, and a lowermost face with a single horizontal slot extending centrally therealong. A plurality of vertical posts are provided to support the overhead beams, and include a lower portion adapted to be abuttingly supported on a floor surface, an upper portion adapted to be connected with an associated one of the overhead beams, and at least one outwardly extending flange having an end face with a single vertical slot extending centrally therealong. Each of the slots in the posts and each of the slots in the beams are substantially identical in size and shape. A plurality of post-to-beam connectors are configured to be attached to the opposite ends of the beams, and are detachably retained in the slots in the posts for mounting the beams on the posts. A plurality of mounting brackets are adapted to mount rigid in-fill panels on the post and beam furniture system to partition the office space into individual work areas. The mounting brackets have first connector portions detachably retained in the slots in the posts and beams, and second connector portions configured for connection with the in-fill panels, whereby the posts and beams can be detachably interconnected in alternative configurations, and the mounting brackets and associated in-fill panels can be positioned at a variety of different locations throughout the post and beam furniture system.

Another aspect of the present invention is a post and beam furniture system for partitioning open office space and the like, comprising a plurality of overhead beams, each having opposite ends, and a lowermost face with a horizontal slot extending therealong. A plurality of vertical posts are provided to support the overhead beams wherein each has a lowermost portion thereof adapted to be abuttingly supported on a floor surface of the open office space, an upper portion adapted to be connected with an associated one of the overhead beams, and at least one outwardly extending flange having an end face with a vertical slot extending therealong. A plurality of post-to-beam connectors are configured to be attached to the opposite ends of the beams, and are detachably retained in the slots in the posts for mounting the beams on the posts. A plurality of rigid in-fill panels are shaped to be positioned directly below the beams and above the floor surface to partition the open office space into individual work areas. A plurality of panel mounting brackets are provided having first connector portions detachably retained in the slots in posts and the beams, and second connector portions connected with the in-fill panels. Each of the slots in the posts and each of the slots in the beams is substantially identical in size and shape to define an integrated universal mounting arrangement in the furniture system for detachably interconnecting the posts and the beams in alternative configurations and mounting the in-fill panels at a variety of different locations.

Yet another aspect of the present invention is a post and beam furniture system of the type having at least one overhead beam and at least one vertical post with a lower portion thereof adapted to be supported on an associated floor surface, and an upper portion connected with the beam. A serpentine panel arrangement comprises a plurality of arcuate in-fill panels, each having a pair of side edges extending along opposite side portions thereof in a normally vertical orientation, and a pair of generally curved top and bottom edges extending along upper and lower portions thereof in a normally horizontal orientation. A plurality of brackets connect each of the in-fill panels to at least one of the posts and the beams in a generally upright orientation, wherein the side edges are disposed adjacent to the side edges of the next adjacent one of the in-fill panels, and the generally curved top and bottom edges are disposed in an alternating facing relationship, such that the in-fill panels collectively define a serpentine partition having a sinusoidal plan configuration which protrudes outwardly from opposite sides of the beam in a wave pattern.

Yet another aspect of the present invention is a post and beam furniture system in combination with a serpentine panel arrangement therefor. The combination includes a plurality of overhead beams, and a plurality of vertical posts, each having a lower portion thereof adapted to be supported on an associated floor surface, and an upper portion thereof connected with at least one of the beams. The combination also includes a plurality of arcuate in-fill panels, each having a pair of generally straight side edges extending along opposite side portions thereof in a normally vertical orientation, and pair of generally curved top and bottom edges extending along upper and lower portions thereof in a normally horizontal orientation. A plurality of brackets connect each of the in-fill panels to the post and beam furniture system in a generally upright orientation, wherein the straight side edges are disposed adjacent to the side edges of the next adjacent one of the in-fill panels, and the generally curved top and bottom edges are disposed in an alternating facing relationship, such that the in-fill panels collectively define a serpentine partition having a sinusoidal plan configuration.

Yet another aspect of the present invention is an in-fill panel mounting system for post and beam furniture systems of the type having a plurality of overhead beams, each including a lowermost face with a single horizontal slot extending therealong, a plurality of vertical posts, each having a lower portion thereof adapted to be abuttingly supported on a floor surface of the open office space, an upper portion thereof connected with an associated one of the overhead beams, at least one outwardly extending flange having an end face with a single vertical slot extending therealong, and a plurality of rigid in-fill panels shaped to be positioned directly below the beams and above the floor surface to partition the office space into individual work areas. The in-fill panel mounting system includes at least one bottom center bracket having a foot adjacent a lower portion thereof shaped for abutting support on the floor surface, and a pair of outwardly extending arms adjacent an upper portion thereof configured to be connected with lower portions of adjacent ones of the in-fill panels. The in-fill panel mounting system also includes at least one top center bracket having a retainer adjacent an upper portion thereof received in the slot of an adjacent one of the beams, and a pair of outwardly extending arms adjacent a lower portion thereof configured to be connected with upper portions of adjacent ones of the in-fill panels. The in-fill panel mounting system further includes at least one top end bracket having a retainer adjacent an upper portion thereof received in the slot of an adjacent one of the posts, and an outwardly extending arm adjacent a lower portion thereof configured to be connected with an upper portion of an adjacent one of the in-fill panels. The in-fill panel mounting system also includes at least one bottom end bracket having a retainer adjacent a lower portion thereof received in the slot of an adjacent one of the posts, and an outwardly extending arm adjacent an upper portion thereof configured to be connected with a lower portion of an adjacent one of the in-fill panels.

Yet another aspect of the present invention is a serpentine partition arrangement for post and beam furniture systems of the type having a plurality of overhead beams and a plurality of vertical posts having lower portions thereof supported on an associated floor surface, and upper portions thereof connected with the beams. The partition arrangement includes a plurality of arcuate in-fill panels, each having a pair of generally straight side edges extending along opposite side portions thereof in a normally vertical orientation, and a pair of generally curved top and bottom edges extending along upper and lower portions thereof in a normally horizontal orientation. The in-fill panels are disposed in a generally upright orientation, wherein the generally straight side edges are disposed adjacent to the side edges of a next adjacent one of the in-fill panels, and the generally curved top and bottom edges are disposed in an alternating facing relationship, such that the in-fill panels collectively define a serpentine partition having a sinusoidal plan configuration.

Yet another aspect of the present invention is a method for furnishing open building plans and the like of the type having a ceiling and a floor surface. The method includes providing a post and beam furniture system having a plurality of horizontal beams positioned to define an overhead framework, and plurality of vertical support posts having lower ends thereof adapted to be abuttingly supported on the floor surface, and upper ends thereof adapted to be connected with the overhead framework. The support posts are positioned at preselected locations on the floor surface, and the opposite ends of the beams are detachably connected with upper ends of the posts to support the overhead framework a predetermined spaced apart distance above the floor surface and below the ceiling. A plurality of arcuate in-fill panels are provided, each having a pair of generally straight side edges extending along opposite side portions thereof in a normally vertical orientation, and a pair of generally curved top and bottom edges extending along upper and lower portions thereof in a normally horizontal orientations. A plurality of brackets are provided to connect each of the in-fill panels to associated ones of the posts and the beams. The in-fill panels are positioned in a generally upright orientation, with the generally straight side edges thereof disposed adjacent to the side edges of the next adjacent one of the in-fill panels, and with the generally curved top and bottom edges disposed in an alternating facing relationship. The brackets are connected to their associated beams, posts and in-fill panels, so that the in-fill panels collectively define a serpentine partition which extends below at least one of the associated beams, and has a sinusoidal plan configuration which protrudes outwardly from the opposite sides of the associated beam in a wave pattern.

The principle objects of the present invention are to provide an in-fill panel arrangement for post and beam furniture systems to effectively and efficiently partition open office space into individual work areas. The posts and beams are equipped with slots that define an integrated universal mounting arrangement in the furniture system for detachably interconnecting the posts and the beams in alternative configurations, and mounting the in-fill panels in a variety of different locations. A set of panel mounting brackets permits attaching a wide variety of different types of in-fill panels to the furniture system to achieve various configurations and aesthetics. Arcuate in-fill panels are provided to be disposed in an alternating facing relationship, such that the same collectively define a serpentine partition having a sinusoidal plan configuration. The furniture system is efficient in use, economical to manufacture, capable of a long operating life and particularly well adapted for the proposed use.

These and other advantages of the invention will be further understood and appreciated by those skilled in the art by reference to the following written specification, claims and appended drawings.

BRIEF DESCRIPTION OF THE DRAWINGS

FIG. 1 is a perspective view of an in-fill panel arrangement and associated post and beam furniture system embodying the present invention.

FIG. 2 is a perspective view of the in-fill panel arrangement and furniture system, shown with arcuate in-fill panels extending around a vertical utility raceway.

FIG. 3 is a front elevational view of another embodiment of the furniture system showing arcuate, fabric covered in-fill panels mounted in a side-by-side relationship.

FIG. 4 is a bottom plan view of the furniture system shown in FIG. 3.

FIG. 5 is a top plan view of the furniture system shown in FIG. 3.

FIG. 6 is an end elevational view of the furniture system shown in FIG. 3.

FIG. 7 is a front elevational view of a top end bracket shown mounting an in-fill panel on the furniture system, a portion of which is broken away to reveal internal construction.

FIG. 8 is an exploded perspective view of the top end bracket.

FIG. 9 is a front elevational view of a top center bracket shown mounting a pair of in-fill panels on the furniture system.

FIG. 10 is an exploded perspective view of the top center bracket.

FIG. 11 is a front elevational view of a bottom center bracket shown supporting adjacent in-fill panels.

FIG. 12 is a perspective view of the bottom center bracket.

FIG. 13 is a front elevational view of a bottom end bracket shown mounting an in-fill panel on the furniture system.

FIG. 14 is an exploded perspective view of the bottom end bracket.

FIG. 15 is an end elevational view of a beam portion of the furniture system.

FIG. 15A is a vertical cross-sectional view of a beam, showing the top center bracket attached thereto.

FIG. 16 is a top plan view of an X-shaped post, showing the top end bracket attached thereto.

FIG. 16A is a top plan view of a Y-shaped post, showing the bottom end bracket attached thereto.

FIG. 18 is an exploded perspective view of a top end bracket and an associated flat in-fill panel.

FIG. 19 is an exploded end elevational view of the top end bracket and the associated flat in-fill panel.

FIG. 20 is an exploded perspective view of the top center bracket and a pair of associated flat in-fill panels.

FIG. 21 is an exploded end elevational view of the top center bracket and an associated flat in-fill panel.

DETAILED DESCRIPTION OF THE PREFERRED EMBODIMENTS

Figure 17:
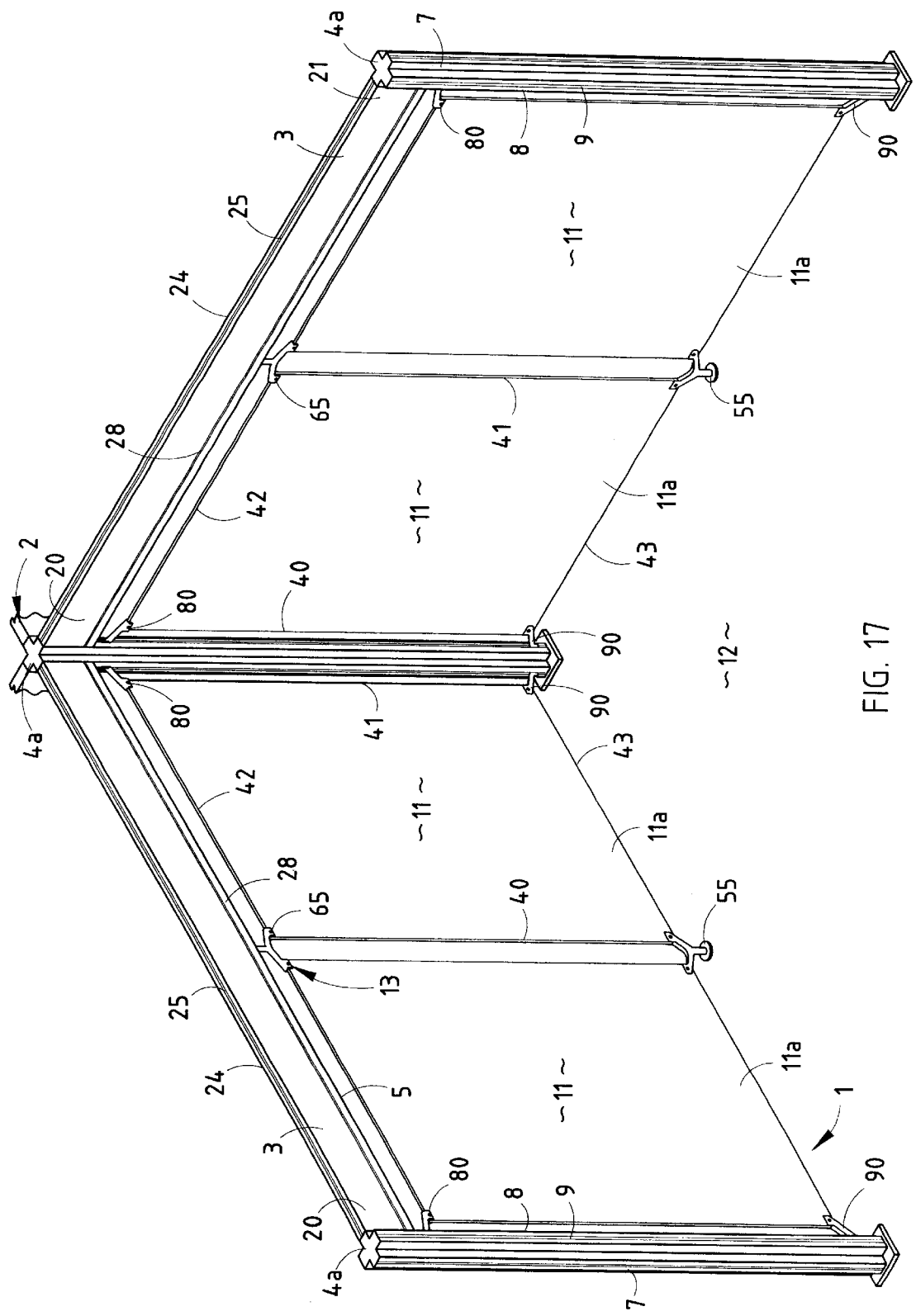
FIG. 17 is a perspective view of the furniture system shown with flat in-fill panels.

For purposes of description herein, the terms "upper", "lower", "right", "left", "rear", "front", "vertical", "horizontal" and derivatives thereof shall relate to the invention as oriented in FIGS. 1 and 2. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appending claims. Hence, specific dimensions and other physical characteristics relating to the embodiments disclosed herein are not to be construed as limiting, unless the claims expressly state otherwise.

The reference numeral 1 (FIG. 1) generally designates an in-fill panel arrangement embodying the present invention, which is designed for furniture systems, such as the illustrated post and beam furniture system 2 of the type having overhead beams 3 supported on vertical posts 4. Each of the beams 3 has a lowermost face 5 with a horizontal slot 6 extending therealong, and each of the posts 4 includes outwardly extending flanges 7 having an end face 8 with a slot 9 extending vertically therealong. Beam-to-post connectors 10 are attached to the opposite ends of the beams 3, and are detachably retained in the slots 9 in posts 4 to mount beams 3 on posts 4. In-fill panels 11 are shaped to be positioned directly below beams 3 and above the associated floor surface 12 to partition the space into individual work areas. Panel mounting brackets 13 are detachably retained in the slots 6 and 9 of beams 3 and posts 4, and are connected with in-fill panels 11. The slots 6 in beams 3 and the slots 9 in posts 4 are substantially identical in size and shape to define an integrated universal mounting arrangement wherein the posts 4 and beams 3 can be interconnected in alternative configurations, and the in-fill panels 11 can be mounted at a variety of different locations. The illustrated beams 3 (FIGS. 1 and 2) are identical to those disclosed in related application Ser. No. 09/800,006, filed Oct. 23, 2000, entitled POST AND BEAM FURNITURE SYSTEM, which is hereby incorporated herein by reference, and include opposite ends 20 and 21 to which beam-to-post connectors 10 are attached. With reference to FIG. 15, beams 3 have a generally rectangular vertical cross-sectional shape defining lower face 5, upper face 24, and opposite side faces 26 and 27. The illustrated slot 6 extending along the lowermost face 5 of beam 3 has a generally T-shaped lateral cross-sectional configuration with an enlarged interior track portion 22 and a reduced neck portion 23 which opens outwardly. The uppermost face 24 of beam 3 also has a single horizontal slot 25 extending centrally therealong. Slot 25 has a generally T-shaped lateral cross-sectional configuration that is identical in shape and size to that of slot 6. The opposite side faces 26 and 27 of beam 3 include hanger slots 28, which extend horizontally therealong a predetermined distance above the lowermost face 5, and are adapted to support accessories therefrom, such as whiteboards, privacy panels, etc. (not shown). Slots 28 have a generally T-shaped lateral configuration that is identical in shape and size to the slots 9 in posts 4. The upper and lower slots 25 and 6 in beams 3 have the same profile as the slots 28 in beams 3 and slots 9 in posts 4 to receive a common T-fastener therein, and are nearly identical in size and shape, except that slots 6 and 25 are somewhat deeper than slots 9 and 28 to facilitate attachment of beam-to-post connectors 10. Integrally formed bosses 30 are also provided in As shown in FIGS. 16 and 16A, in the illustrated example, posts 4 include an X-shaped post 4a and a Y-shaped post 4b, which are substantially identical in construction. X-shaped post 4a has four mutually perpendicular outwardly extending flanges 7a, each of which has a flat end face 8a with a single vertical slot 9a extending therealong. Each of the slots 9a has a generally T-shaped lateral cross-sectional configuration that is identical in shape and size to the previously described slot 6 in beam 3. The illustrated X-shaped post 4a has a hollow interior 35 with inwardly projecting reinforcing ribs 36. The illustrated Y-shaped post 4b is substantially identical to the previously described X-shaped post 4a, except that it has only three flanges 7b which are spaced 120 degrees apart.

In the illustrated examples of in-fill panel arrangement 1, two different types of in-fill panels 11 are provided, including flat in-fill panels 11a and arcuate in-fill panels 11b. FIG. 17 illustrates an embodiment of the present invention which incorporates only flat in-fill panels 11a. FIG. 2 illustrates an embodiment of the present invention incorporating only arcuate in-fill panels 11b. FIG. 1 illustrates an embodiment of the present invention having both flat in-fill panels 11a and arcuate in-fill panels 11b. As best illustrated in FIG. 17, flat in-fill fill panels 11 are rigid, and have a substantially rectangular front elevational configuration, including generally straight side edges 40 and 41, and generally straight top and bottom edges 42 and 43 respectively. Flat in-fill panels 11 are generally planar and/or flat, and are constructed from a rigid self-supporting material, such as wood, plastic, composite materials and the like. In the example illustrated in FIG. 17, each of the flat in-fill panels 11 has a substantially identical width and height, and is mounted in a side-by-side relationship by panel mounting brackets 13 in the manner described in greater detail hereinafter.

The illustrated curved in-fill panels 11b (FIGS. 2–6) have a generally rectangular front elevational configuration, and include straight side edges 48 and 49 extending along opposite side portions thereof in a normally vertical orientation, and curved top and bottom edges 50 and 51 which extend along the upper and lower portions thereof in a normally horizontal direction. The arcuate in-fill panels 11b shown in FIGS. 1 and 2 are also substantially rigid, and may be constructed from any suitable material, such as wood, plastic, composite materials and the like. In the illustrated examples, each of the arcuate in-fill panels 11b has a substantially identical height and width, and is mounted in a side-by-side relationship by mounting brackets 13 in the manner described in greater detail hereinafter. Preferably, the curved top and bottom edges 50 and 51 of adjacent arcuate in-fill panels 11b are disposed in an alternating facing relationship, such that the three adjacent arcuate in-fill panels 11b shown in FIGS. 1 and 3–6 collectively define a serpentine partition having a sinusoidal plan configuration which protrudes outwardly from opposite sides of the associated beam 3 in a wave pattern, as best illustrated in FIGS. 4–6.

In the example illustrated in FIGS. 3–6, curved in-fill panels 11b are constructed using a rigid marginal frame 52 with a panel 53 of flexible material covering frame 52. The illustrated frame 52 is constructed from a rigid cylindrically-shaped rod bent into a rectangular shape with the ends interconnected. The illustrated panel 53 is made from a stretch fabric with sewn-in pockets around the marginal edges thereof in which wire frame 52 is received and retained. In one working embodiment of the present invention, fabric panel 53 is stretched taut over wire frame 52 to create a translucent or see-through appearance.

In the illustrated example of in-fill panel arrangement 1, four different types of mounting brackets 13 are provided. With reference to FIGS. 11 and 12, mounting brackets 13 include bottom center brackets 55, each of which has a circular foot 56 adjacent a lower portion thereof for abutting support on floor surface 12, and a pair of outwardly extending arms 57 adjacent an upper portion thereof configured to be connected with the lower portions of adjacent in-fill panels 11. The bottom center bracket 55 illustrated in FIGS. 11 and 12 has a generally Y-shaped front elevational configuration, wherein arms 57 extend upwardly and outwardly, and includes a circular stem portion 58 disposed between foot 56 and arms 57. The outermost ends of arms 57 are U-shaped to receive therebetween an in-fill panel 11. Laterally extending fastener apertures 59 are provided adjacent the ends of arms 57, and receive fasteners 60 therein, which with nuts 60a, positively attach bottom center bracket 55 to an adjacent pair of in-fill panels 11.

The illustrated mounting brackets 13 also include top center brackets 65 (FIGS. 9 and 10), each of which has a retainer 66 disposed adjacent an upper portion thereof which is received in the slot 6 of an adjacent one of the beams 3, as well as a pair of outwardly extending arms 67 adjacent a lower portion thereof which are configured to be connected with upper portions of adjacent ones of the in-fill panels 11. In the illustrated example, each top center bracket 65 has an inverted Y-shaped front elevational configuration similar to that of bottom center bracket 55, and includes a central stem 68 with a central aperture 69 through which a threaded fastener 70 is received to attach retainer 66. The illustrated retainer 66 is in the form of a T-nut, having a generally T-shaped lateral cross-sectional configuration with a bottom threaded aperture (not shown) in which fastener 70 is received. T-nut 66 is sized and shaped to be closely received in the slot 6 in beam 3. Like the previously described bottom center bracket 55, the arms 67 of top center bracket 65 have U-shaped ends in which the upper edges of in-fill panels 11 are received, as well as laterally extending fastener apertures 71 in which threaded fasteners 72 are received, which with nuts 72a, positively retain adjacent in-fill panels 11 therein.

With reference to FIGS. 7 and 8, the illustrated mounting brackets 13 also include top end brackets 80, each having a retainer 81 positioned adjacent an upper portion thereof to be received in the slot 9 of an associated post 4, and an outwardly extending arm 82 adjacent a lower portion thereof configured to be connected with an upper portion of an adjacent one of the in-fill panels 11. The retainer 81 associated with the illustrated top end bracket 80 is in the form of a T-nut with a threaded fastener aperture 87, and is substantially identical to previously described retainer 66. In the illustrated example, arm 82 extends at an angle similar to the arms 67 of top center bracket 65 to provide a neat, consistent design theme. The upper end of arm 82 is upstanding and includes a laterally extending fastener aperture 83 through which a threaded fastener 84 extends to mount T-nut retainer 81. The lower end of arm 82 is U-shaped to receive therein the upper edge of an associated in-fill panel 11, and also includes a laterally extending threaded fastener aperture 85 in which a mating threaded fastener 86 is received, which along with nut 86a, positively retains the upper edge of an associated in-fill panel 11 therein.

In the illustrated example, mounting brackets 13 also include bottom end brackets 90 (FIGS. 13 and 14), each of which has a retainer 91 adjacent a lower portion thereof which is shaped to be received in the slot 9 of an associated post 4, and an outwardly extending arm 92 adjacent an upper portion thereof configured to be connected with a lower portion of an adjacent in-fill panel 11. The illustrated retainer 91 is in the form of a T-nut that is substantially identical to the previously described retainers 66 and 81. In the illustrated example, arm 92 extends at an angle similar to the arms 57 of bottom center bracket 55. The upper end of arm 92 is U-shaped to receive the bottom edge of an associated in-fill panel 11 therein, and includes a laterally extending fastener aperture 94 in which an associated fastener 95 is received, which along with nut 95a, positively attaches bracket 90 to the lower edge of an associated in-fill panel 11.

Mounting brackets 13 may also include single arm top center brackets (not shown), which are identical to the previously described top center brackets 65, except that each has only a single arm, instead of the pair of arms 67 associated with top center brackets 65. The single arm top center bracket is used when a portion of the space under a selected beam 3 is to be left open.

When mounting brackets 13 are used to mount in-fill panels 11 of the type having a wire marginal frame 52 and fabric cover panel 53, as described above, the fastener apertures 59, 71, 85 and 94 in the U-shaped ends of brackets 55, 65, 80 and 90 may be omitted, and the U-shaped ends are configured to snap or clamp onto the wire marginal frame 52 to attach the same to in-fill panels 11. Other types of attachment systems may also be used to connect brackets 55, 65, 80 and 90 to in-fill panels 11, as will be apparent to those having skill in the art.

Mounting brackets 13 permit attaching a wide variety of different types of in-fill panels 11 to furniture system 2 to achieve various configurations and aesthetics. Hence, in-fill panels 11 can be varied in different sizes and shapes, as well as surface finishes, to accommodate a given office environment. For example, the shape of in-fill panels 11 can be selected to match the shape of the building walls and/or adjacent partition panel systems to provide a completely integrated furniture system. Also, the user may specify particular shapes or surface coverings to comport with their company theme, style or trade dress.

To furnish an open building plan or the like, posts 4 are positioned at preselected locations on the floor surface, and horizontal beams 3 are detachably connected to the upper ends of posts 4 using post-to-beam connectors 10, so as to define an overhead framework disposed a predetermined spaced apart distance above the floor surface 12 and below the ceiling. In-fill panels 11 are then selected in accordance with the desired configuration. In the example illustrated in FIG. 1, a row of flat in-fill panels 11a are mounted to the adjacent posts 4 and beams 3 by mounting brackets 13. As shown in FIGS. 18–21, the top end brackets 80 are attached to their associated posts 4 by inserting retainers 81 into the slots 9 of posts 4, and then inserting fasteners 84 through apertures 83 into the threaded apertures 87 in retainers 81 and tightening the same. The top edge 50 of each in-fill panel 11 is inserted into the U-shaped end of top end bracket 80, and fasteners 86 are inserted through the fastener aperture 85 in brackets 80, as well as the mating apertures 100 adjacent the corners of in-fill panels 11 and then tightened with nuts 86a. Top center brackets 65 and bottom end brackets 90 are similarly attached to their associated posts 4 and beams 3, as well as in-fill panels 11. The bottom center brackets 55 are simply attached to the bottom edges 51 of adjacent in-fill panels 11 using fasteners 60 and nuts 60a.

In the example illustrated in FIG. 1, a row of arcuate in-fill panels 11b is also positioned side-by-side, with mounting brackets 13 connecting arcuate in-fill panels 11 to the associated posts 4 and beams 3 in the same manner described hereinabove. The curved top and bottom edges of arcuate in-fill panels 11 are disposed in an alternating facing relationship, so that the arcuate in-fill panels 11 collectively define a serpentine partition which extends below the associated beam 3, and has a sinusoidal plan configuration that protrudes outwardly from opposite sides of the beam 3 in a wave pattern.

As best illustrated in FIGS. 1 and 2, arcuate in-fill panels 11b may be used to hide vertical obstructions, such as the vertical utility raceway 101 shown in FIG. 2, which extends from the floor surface 12 to an associated beam 3 to route electrical power, communications cables and other similar utilities to the individual workstations. In the illustrated example, furniture system 2 and arcuate in-fill panels 11 are positioned such that utility raceway 101 is disposed along the center of the middle in-fill panel 11b, where the same protrudes outwardly from the associated beam 3. Arcuate in-fill panels 11b thereby hide utility raceway 101 from one side of the partition, yet permit the utility raceway 101 to extend directly from the floor surface 12 to the next adjacent beam 3.

In the foregoing description, it will be readily appreciated by those skilled in the art that modifications may be made to the invention without departing from the concepts disclosed herein. Such modifications are to be considered as included in the following claims, unless these claims by their language expressly state otherwise.

What is claimed is:

1. A post and beam furniture system for partitioning open office space, comprising:

a plurality of overhead beams, each having opposite ends, and a lowermost face with a single horizontal slot extending centrally therealong;

a plurality of vertical posts, each having a lower portion thereof adapted to be abuttingly supported on a floor surface of the open office space, an upper portion thereof adapted to be connected with an associated one of said overhead beams, and at least one outwardly extending flange having an end face with a single vertical slot extending centrally therealong, and wherein each of said slots in said posts, and each of said slots in said beams are substantially identical in size and shape;

a plurality of beam-to-post connectors configured to be attached to the opposite ends of said beams, and detachably retained in said slots in said posts for mounting said beams on said posts; and a plurality of mounting brackets adapted to mount rigid in-fill panels on said post and beam furniture system to partition the open office space into individual work areas, and having first connector portions thereof detachably retained in said slots in said posts and said beams, and second connector portions thereof configured for connection with the in-fill panels, whereby said posts and said beams can be detachably interconnected in alternative configurations, and said mounting brackets and associated in-fill panels can be positioned at a variety of different locations throughout said post and beam furniture system.

2. A furniture system as set forth in claim 1, wherein:

said mounting brackets include at least one bottom center bracket having a foot adjacent a lower portion thereof shaped for abutting support on the floor surface, and a pair of outwardly extending arms adjacent an upper portion thereof configured to be connected with lower portions of adjacent ones of the in-fill panels.

3. A furniture system as set forth in claim 2, wherein:

said mounting brackets include at least one top center bracket having a retainer adjacent an upper portion thereof received in said slot of an adjacent one of said beams, and a pair of outwardly extending arms adjacent a lower portion thereof configured to be connected with upper portions of adjacent ones of the in-fill panels.

4. A furniture system as set forth in claim 3, wherein:

said mounting brackets include at least one top end bracket having a retainer adjacent an upper portion thereof received in said slot of an adjacent one of said posts, and an outwardly extending arm adjacent a lower portion thereof configured to be connected with an upper portion of an adjacent one of the in-fill panels.

5. A furniture system as set forth in claim 4, wherein:

said mounting brackets include at least one bottom end bracket having a retainer adjacent a lower portion thereof received in said slot of an adjacent one of said posts, and an outwardly extending arm adjacent an upper portion thereof configured to be connected with a lower portion of an adjacent one of the in-fill panels.

6. A furniture system as set forth in claim 5, including:

a plurality of arcuate in-fill panels, each having a pair of side edges extending along opposite side portions thereof in a normally vertical orientation, and a pair of generally curved top and bottom edges extending along upper and lower portions thereof in a normally horizontal orientation; and wherein said mounting brackets connect each of said arcuate in-fill panels to at least one of said posts and said beams in a generally upright orientation, wherein said side edges are disposed adjacent to said side edges of a next adjacent one of said arcuate in-fill panels, and said generally curved top and bottom edges are disposed in an alternating relationship, such that said arcuate in-fill panels collectively define a serpentine partition having a sinusoidal plan configuration which protrudes outwardly from opposite sides of said beam in a wave pattern.

7. A furniture system as set forth in claim 6, including:
a plurality of flat in-fill panels, each having a pair of side edges extending along opposite side portions, and a pair of generally straight top and bottom edges extending along upper and lower portions thereof in a normally horizontal orientation.

8. A furniture system as set forth in claim 7, including:
a utility raceway extending generally vertically from the floor surface to said beam; and wherein
said serpentine partition is positioned such that an outwardly curved center portion of said serpentine partition extends around said utility raceway to visually block the same from at least one side of said serpentine partition.

9. A furniture system as set forth in claim 8, wherein:
said arcuate in-fill panels each have a generally similar arcuate shape.

10. A furniture system as set forth in claim 9, wherein:
said arcuate and flat in-fill panels each have a generally similar width.

11. A furniture system as set forth in claim 10, wherein:
said arcuate and flat in-fill panels each have a generally similar height.

12. A furniture system as set forth in claim 11, wherein:
said side edges of said arcuate in-fill panels are generally straight and disposed parallel to the side edge of a next adjacent one of said arcuate in-fill panels.

13. A furniture system as set forth in claim 12, wherein:
said side edges of said flat in-fill panels are generally straight and disposed parallel to the side edge of a next adjacent one of said flat in-fill panels.

14. A furniture system as set forth in claim 13, wherein:
said slots each have a generally T-shaped lateral cross-sectional configuration with an enlarged interior track portion and a reduced neck portion which opens outwardly.

15. A furniture system as set forth in claim 14, wherein:
said posts include at least one X-shaped post having four mutually perpendicular outwardly extending flanges.

16. A furniture system as set forth in claim 15, wherein:
said posts include at least one Y-shaped post having three outwardly extending flanges.

17. A furniture system as set forth in claim 1, wherein:
said mounting brackets include at least one top center bracket having a retainer adjacent an upper portion thereof received in said slot of an adjacent one of said beams, and a pair of outwardly extending arms adjacent a lower portion thereof configured to be connected with upper portions of adjacent ones of the in-fill panels.

18. A furniture system as set forth in claim 1, wherein:
said mounting brackets include at least one top end bracket having a retainer adjacent an upper portion thereof received in said slot of an adjacent one of said posts, and an outwardly extending arm adjacent a lower portion thereof configured to be connected with an upper portion of an adjacent one of the in-fill panels.

19. A furniture system as set forth in claim 1, wherein:
said mounting brackets include at least one bottom end bracket having a retainer adjacent a lower portion thereof received in said slot of an adjacent one of said posts, and an outwardly extending arm adjacent an upper portion thereof configured to be connected with a lower portion of an adjacent one of the in-fill panels.

20. A furniture system as set forth in claim 1, including:
a plurality of arcuate in-fill panels, each having a pair of side edges extending along opposite side portions thereof in a normally vertical orientation, and a pair of generally curved top and bottom edges extending along upper and lower portions thereof in a normally horizontal orientation; and wherein
said mounting brackets connect each of said arcuate in-fill panels to at least one of said posts and said beams in a generally upright orientation, wherein said side edges are disposed adjacent to said side edges of a next adjacent one of said arcuate in-fill panels, and said generally curved top and bottom edges are disposed in an alternating relationship, such that said arcuate in-fill panels collectively define a serpentine partition having a sinusoidal plan configuration which protrudes outwardly from opposite sides of said beam in a wave pattern.

21. A furniture system as set forth in claim 20, including:
a utility raceway extending generally vertically from the floor surface to said beam; and wherein
said serpentine partition is positioned such that an outwardly curved center portion of said serpentine partition extends around said utility raceway to visually block the same from at least one side of said serpentine partition.

22. A furniture system as set forth in claim 21, wherein:
said arcuate in-fill panels each have a generally similar arcuate shape, a generally similar width, and a generally similar height.

23. A furniture system as set forth in claim 1, including:
a plurality of flat in-fill panels, each having a pair of side edges extending along opposite side portions, and a pair of generally straight top and bottom edges extending along upper and lower portions thereof in a normally horizontal orientation.

24. A furniture system as set forth in claim 1, wherein:
said slots each have a generally T-shaped lateral cross-sectional configuration with an enlarged interior track portion and a reduced neck portion which opens outwardly.

25. A post and beam furniture system for partitioning open office space, comprising:
a plurality of overhead beams, each having opposite ends, and a lowermost face with a horizontal slot extending therealong;
a plurality of vertical posts, each having a lower portion thereof adapted to be abuttingly supported on a floor surface of the open office space, an upper portion thereof adapted to be connected with an associated one of said overhead beams, and at least one outwardly extending flange having an end face with a vertical slot extending therealong;
a plurality of beam-to-post connectors configured to be attached to the opposite ends of said beams, and detachably retained in said slots in said posts for mounting said beams on said posts;
a plurality of rigid in-fill panels shaped to be positioned directly below said beams and above the floor surface to partition the open office space into individual work areas;

a plurality of panel mounting brackets having first connector portions thereof detachably retained in said slots in said posts and said beams, and second connector portions thereof connected with said in-fill panels; and wherein each of said slots in said posts, and each of said slots in said beams is substantially identical in size and shape to define an integrated universal mounting arrangement in said furniture system for detachably interconnecting said posts and said beams in alternative configurations, and mounting said in-fill panels at a variety of different locations.

26. A furniture system as set forth in claim 25, wherein:
said mounting brackets include at least one bottom center bracket having a foot adjacent a lower portion thereof shaped for abutting support on the floor surface, and a pair of outwardly extending arms adjacent an upper portion thereof configured to be connected with lower portions of adjacent ones of the in-fill panels.

27. A furniture system as set forth in claim 25, wherein:
said mounting brackets include at least one top center bracket having a retainer adjacent an upper portion thereof received in said slot of an adjacent one of said beams, and a pair of outwardly extending arms adjacent a lower portion thereof configured to be connected with upper portions of adjacent ones of the in-fill panels.

28. A furniture system as set forth in claim 25, wherein:
said mounting brackets include at least one top end bracket having a retainer adjacent an upper portion thereof received in said slot of an adjacent one of said posts, and an outwardly extending arm adjacent a lower portion thereof configured to be connected with an upper portion of an adjacent one of the in-fill panels.

29. A furniture system as set forth in claim 25, wherein:
said mounting brackets include at least one bottom end bracket having a retainer adjacent a lower portion thereof received in said slot of an adjacent one of said posts, and an outwardly extending arm adjacent an upper portion thereof configured to be connected with a lower portion of an adjacent one of the in-fill panels.

30. In a post and beam furniture system of the type having at least one overhead beam and at least one vertical post with a lower portion thereof adapted to be supported on an associated floor surface, and an upper portion thereof connected with said beam, the improvement of a serpentine panel arrangement comprising:

a plurality of arcuate in-fill panels, each having a pair of side edges extending along opposite side portions thereof in a normally vertical orientation, and a pair of generally curved top and bottom edges extending along upper and lower portions thereof in a normally horizontal orientation; and a plurality of brackets connecting each of said in-fill panels to at least one of said posts and said beams in a generally upright orientation, wherein said side edges are disposed adjacent to said side edges of a next adjacent one of said in-fill panels, and said generally curved top and bottom edges are disposed in an alternating facing relationship, such that said in-fill panels collectively define a serpentine partition having a sinusoidal plan configuration which protrudes outwardly from opposite sides of said beam in a wave pattern.

31. A furniture system as set forth in claim 30, wherein:
said side edges of each of said in-fill panels are generally straight such that said serpentine partition extends substantially continuously along said beam.

32. A furniture system as set forth in claim 31, wherein:
each of said in-fill panels has a non-transparent appearance to define a visual partition between areas of an associated open space.

33. A furniture system as set forth in claim 32, wherein:
said beam has a lowermost face with a single horizontal slot extending centrally therealong; and
at least one of said brackets is configured to be removably mounted in said slot in said beam.

34. A furniture system as set forth in claim 33, wherein:
said post has at least one end face with a single vertical slot extending centrally therealong; and
at least one of said brackets is configured to be removably mounted in said slot in said post.

35. A furniture system as set forth in claim 34, wherein:
at least one of said brackets includes a foot shaped for abutting support on the floor surface, and a pair of outwardly extending arms connected with lower portions of adjacent in-fill panels.

36. A furniture system as set forth in claim 35, wherein:
at least one of said in-fill panels includes a rigid marginal frame, and a panel of flexible material covering said frame.

37. A furniture system as set forth in claim 36, wherein:
said flexible material comprises a stretch fabric.

38. A furniture system as set forth in claim 37, including:
a utility raceway extending generally vertically from the floor surface to said beam; and wherein
said serpentine partition is positioned such that an outwardly curved center portion of said serpentine partition extends around said utility raceway to visually block the same from at least one side of said serpentine partition.

39. A furniture system as set forth in claim 38, wherein:
said in-fill panels each have a generally similar arcuate shape.

40. A furniture system as set forth in claim 39, wherein:
said in-fill panels each have a generally similar width.

41. A furniture system as set forth in claim 40, wherein:
said in-fill panels each have a generally similar height.

42. A furniture system as set forth in claim 41, wherein:
said posts include X-shaped posts and Y-shaped posts.

43. In combination, a post and beam furniture system and a serpentine panel arrangement therefor, comprising:

a plurality of overhead beams;

a plurality of vertical posts, each having a lower portion thereof adapted to be supported on an associated floor surface, and an upper portion thereof connected with at least one of said beams;

a plurality of arcuate in-fill panels, each having a pair of generally straight side edges extending along opposite side portions thereof in a normally vertical orientation, and a pair of generally curved top and bottom edges extending along upper and lower portions thereof in a normally horizontal orientation; and a plurality of brackets connecting each of said in-fill panels to said post and beam furniture system in a generally upright orientation, wherein said generally straight side edges are disposed adjacent to said side edges of a next adjacent one of said in-fill panels, and said generally curved top and bottom edges are disposed in an alternating facing relationship, such that said in-fill panels collectively define a serpentine partition having a sinusoidal plan configuration.

44. A combination furniture system and panel arrangement as set forth in claim 43, wherein:

one of said beams has opposite ends thereof connected with the upper portions of two of said posts to define a frame area having an inverted U-shaped front elevational configuration; and said serpentine partition is positioned in said frame area, extends between said two posts, and protrudes outwardly from opposite sides of said one beam in a wave pattern.

45. A combination furniture system and panel arrangement as set forth in claim 44, wherein:

said overhead beams include first and second beams, each of which has opposite ends;

said posts include first, second and third posts disposed in a laterally spaced apart, in-line relationship, wherein said second post is disposed in between said first post and said third post;

said first beam has the opposite ends thereof connected with the upper portions of said first and second posts, and said second beam has the opposite ends thereof connected with the upper portions of said second and third posts; and said serpentine partition extends continuously between said first and third posts, and has one side portion thereof connected with said first post, an opposite side portion thereof connected with said third post, and a center portion thereof which is not connected to said second post.

46. A combination furniture system and panel arrangement as set forth in claim 45, wherein:

said serpentine partition is configured such that said center portion thereof is disposed a spaced apart distance from said second post.

47. A combination furniture system and panel arrangement as set forth in claim 46, wherein:

said in-fill panels each have a generally similar shape.

48. An in-fill panel mounting system for post and beam furniture systems of the type having a plurality of overhead beams, each having a lowermost face with a single horizontal slot extending therealong, a plurality of vertical posts, each having a lower portion thereof adapted to be abuttingly supported on a floor surface of the open office space, an upper portion thereof connected with an associated one of the overhead beams, and at least one outwardly extending flange having an end face with a single vertical slot extending therealong, and a plurality of rigid in-fill panels shaped to be positioned directly below the beams and above the floor surface to partition the open office space into individual work areas, comprising:

at least one bottom center bracket having a foot adjacent a lower portion thereof shaped for abutting support on the floor surface, and a pair of outwardly extending arms adjacent an upper portion thereof configured to be connected with lower portions of adjacent ones of the in-fill panels;

at least one top center bracket having a retainer adjacent an upper portion thereof received in the slot of an adjacent one of the beams, and a pair of outwardly extending arms adjacent a lower portion thereof configured to be connected with upper portions of adjacent ones of the in-fill panels;

at least one top end bracket having a retainer adjacent an upper portion thereof received in the slot of an adjacent one of the posts, and an outwardly extending arm adjacent a lower portion thereof configured to be connected with an upper portion of an adjacent one of the in-fill panels; and at least one bottom end bracket having a retainer adjacent a lower portion thereof received in said slot of an adjacent one of said posts, and an outwardly extending arm adjacent an upper portion thereof configured to be connected with a lower portion of an adjacent one of the in-fill panels.

49. A serpentine partition arrangement for post and beam furniture systems of the type having a plurality of overhead beams and a plurality of vertical posts having lower portions thereof supported on an associated floor surface, and upper portions thereof connected with the beams, comprising:

a plurality of arcuate in-fill panels, each having a pair of generally straight side edges extending along opposite side portions thereof in a normally vertical orientation, and a pair of generally curved top and bottom edges extending along upper and lower portions thereof in a normally horizontal orientation; said in-fill panels being disposed in a generally upright orientation, wherein said generally straight side edges are disposed adjacent to said side edges of a next adjacent one of said in-fill panels, and said generally curved top and bottom edges are disposed in an alternating facing relationship, such that said in-fill panels collectively define a serpentine partition having a sinusoidal plan configuration.

50. A method for furnishing open building plans and the like of the type having a ceiling and a floor surface, comprising:

providing a post and beam furniture system including a plurality of horizontal beams positioned to define an overhead framework, and a plurality of vertical support posts having lower ends thereof adapted to be abuttingly supported on the floor surface, and upper ends thereof adapted to be connected with the overhead framework;

positioning the support posts at preselected locations on the floor surface, and detachably connecting the upper ends thereof with the horizontal beams to support the overhead framework a predetermined spaced apart distance above the floor surface and below the ceiling;

providing a plurality of arcuate in-fill panels, each having a pair of generally straight side edges extending along opposite side portions thereof in a normally vertical orientation, and a pair of generally curved top and bottom edges extending along upper and lower portions thereof in a normally horizontal orientation;

providing a plurality of brackets configured to connect each of the in-fill panels to associated ones of the posts and the beams;

positioning each of the in-fill panels in a generally upright orientation, with the generally straight side edges thereof disposed adjacent to the side edges of a next adjacent one of the in-fill panels, and with the generally curved top and bottom edges disposed in an alternating facing relationship; and connecting the brackets to their associated beams, posts and in-fill panels, so that the in-fill panels collectively define a serpentine partition which extends below at least one of the associated beams, and has a sinusoidal plan configuration which protrudes outwardly from opposite sides of the one beam in a wave pattern.

* * * * *

UNITED STATES PATENT AND TRADEMARK OFFICE
CERTIFICATE OF CORRECTION

PATENT NO.    : 6,510,663 B2                                           Page 1 of 1
DATED         : January 28, 2003
INVENTOR(S)   : Michael A. Jourden et al.

It is certified that error appears in the above-identified patent and that said Letters Patent is hereby corrected as shown below:

<u>Title page, Item [54] and Column 1, lines 1 and 2,</u>
"IN-FILL ARRANGEMENT FOR POST AND BEAM FURNITURE SYSTEMS" should be -- IN-FILL PANEL ARRANGEMENT FOR POST AND BEAM FURNITURE SYSTEMS --.

<u>Column 1,</u>
Lines 29 and 35-36, "Steelcas Development Inc." should be -- Steelcase Development Corporation --.

<u>Column 2,</u>
Line 63, before "pair" insert -- a --.

<u>Column 4,</u>
Line 13, "orientations" should be -- orientation --.
Line 26, "principle" should be -- principal --.

<u>Column 6,</u>
Line 36, after "provided in" insert -- the illustrated beam 3 to facilitate attachment of beam-to-post connectors 10 to the opposite ends 20 and 21 thereof. --
Line 60, after "in-fill" delete "fill".

Signed and Sealed this

Twenty-ninth Day of July, 2003

JAMES E. ROGAN
*Director of the United States Patent and Trademark Office*